United States Patent [19]

Nose et al.

[11] Patent Number: 4,595,290
[45] Date of Patent: Jun. 17, 1986

[54] DEVICE FOR MEASURING LIGHT INCIDENT ON AN OPTICAL SYSTEM

[75] Inventors: Noriyuki Nose; Kiyonobu Endo, both of Yokohama, Japan

[73] Assignee: Canon Kabushiki Kaisha, Tokyo, Japan

[21] Appl. No.: 283,233

[22] Filed: Jul. 14, 1981

[30] Foreign Application Priority Data

Jul. 24, 1980 [JP] Japan ................. 55-101506
Jul. 24, 1980 [JP] Japan ................. 55-101507
Jul. 24, 1980 [JP] Japan ................. 55-101509
Jul. 24, 1980 [JP] Japan ................. 55-101514

[51] Int. Cl.$^4$ ............................................. G01J 1/42
[52] U.S. Cl. ................................... 356/225; 350/172; 350/162.2
[58] Field of Search ............ 350/169, 172, 162.17, 350/162.2, 162.21, 162.22, 162.23, 162.24; 356/218, 225; 354/59, 42

[56] References Cited

U.S. PATENT DOCUMENTS 3,464,337  9/1969  Tranker ........................... 95/42
4,103,153  7/1975  Matsumoto et al. ........... 250/227
4,178,084  12/1979 Matsumoto et al. ........... 354/59

Primary Examiner—Bruce Y. Arnold

[57] ABSTRACT

This invention provides a device for measuring light incident on an optical system. This device includes an optical system defining an optical path, a beam splitter and a photo detector. The beam splitter has a relief type diffraction lattice having a plurality of semireflecting surfaces periodically arranged and included in a transparent body. The diffraction lattice is arranged to split a portion of the incident light by its effect of reflection/diffraction and its beam splitting efficiency having a predetermined distribution within the lattice area. The diffracted light from the diffraction lattice is directed to the photo detector.

9 Claims, 45 Drawing Figures

DEVICE FOR MEASURING LIGHT INCIDENT ON AN OPTICAL SYSTEM

BACKGROUND OF THE INVENTION

1. Field of the Invention

This invention relates to a device for measuring light incident on an optical system. More particularly, the invention is concerned with such a device which is adaptable to a light metering device in a photographic camera.

2. Description of the Prior Art

The light metering device in a photographic camera splits a portion of an image-forming light beam which has passed through an objective lens by a beam splitter, and the thus split light is detected by a photo detector. For the light beam splitter useful for such light metering device, there has so far been used a single half mirror which is obliquely disposed in the camera. Such a beam splitting device for use in a camera, etc. should desirably be as thin as possible. U.S. Pat. No. 3,464,337 discloses a device in which two members, each being provided on its surface with a plurality of slant reflecting surfaces, are cemented together to form a prismatic line raster, and a portion of the incident light is split for light measuring.

In the case of a light measuring device used in a single lens reflex camera or a similar camera, the light measuring device is desired to have the ability to measure light in proper correspondence to the distribution of brightness on an object. U.S. Pat. Nos. 4,103,153 and 4,178,084 have disclosed such a light measuring device in which a hologram has been used as beam splitter. The hologram is formed making use of the interference phenomenon of light. In this case, the above object is attained by superposing two or more holograms one on another or by making the hologram have a certain distribution of intensity in the interference fringe.

SUMMARY OF THE INVENTION

It is an object of the present invention to provide a light measuring device which measures the incident light on the basis of a distribution of measurements differently weighted as desired.

It is another object of the invention to provide a light measuring device which is able to measure the incident light on the basis of a desired distribution of measurements or photometric distribution and produces no split light harmful for measurement, and in which a very thin beam splitter is used.

Other and further objects, features and advantages of the present invention will appear more fully from the following description taken in connection with the accompanying drawings.

DESCRIPTION OF THE PREFERRED EMBODIMENTS

In typical embodiments of the invention there is used a diffraction grating or lattice. An advantage of diffraction lattice is found in that it is thin in thickness. When the device for measuring the incident light employing a diffraction lattice is to be used in a photographic camera, the diffraction lattice is required not to produce any useless diffracted light other than diffracted light of a particular order for light measuring and image forming light beam emerging from the diffraction lattice. The reason for this is that such useless diffracted light brings about flare and ghosting which are harmful to the formation of an object image and the observation thereof.

An example of such beam splitter satisfying the above requirement is disclosed in our earlier filed application, Japanese Patent Application laid open No. 42,042/1978. The beam splitter proposed by the earlier application is formed using a relief type diffraction lattice which can be manufactured in mass production. The diffraction lattice generally called a relief type diffraction lattice is featured by its uneven surface having a periodical relief structure. Beam splitters employing this type of diffraction lattice can be manufactured in mass production employing a copying technique known in the art of reproduction such as compression reproduction from a matrix. Furthermore, the beam splitter has another advantage that it can be manufactured using various kinds of stable and inexpensive materials known in the art such as plastics.

At first, diffraction characteristics of a relief type (especially blazed type) diffraction lattice will be described with reference to FIG. 1.

The beam splitter disclosed in the above mentioned Japanese Patent Application laid open No. 42,042/1978 uses a blazed diffraction lattice which is a kind of relief type diffraction lattice and has the property of diffracting almost all of the incident rays in a particular order of diffraction. The use of such a relief type blazed diffraction lattice as the beam splitter attains a diffraction efficiency higher than 90% as to zero-order transmission refracted light useful for forming an object image and a diffraction efficiency of several % as to the first order diffraction light useful for measuring light while reducing the diffraction efficiencies of other orders nearly to zero.

Figure 1:
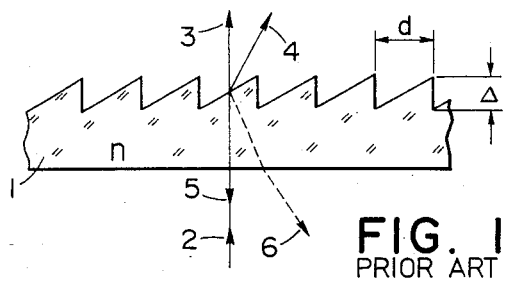
FIG. 1 is a sectional view of a relief type diffraction grating.

In FIG. 1, reference numeral 1 designates a relief type blazed diffraction lattice having a relief structure formed on the surface of a transparent body having a refractive index of n. The relief structure is so formed as to have a pitch (periodical distance) of d and a relief height of Δ.

Designated by 2 is a beam of light incident on the diffraction lattice 1. The incident light is diffracted by the diffraction lattice 1 and there are produced, as transmitted light, a zero-order transmission diffracted light 3 which passed through the diffraction lattice 1 in the same direction as it entered the lattice, and N-order transmission diffracted light 4. Also, there are produced, as reflected light, O-order reflection diffracted light 5 which was reflected in the direction of regular reflection (in the direction of mirror reflection) relative to the lattice surface, and N-order reflection diffracted light 6, where N is an optional whole number.

Figure 2:
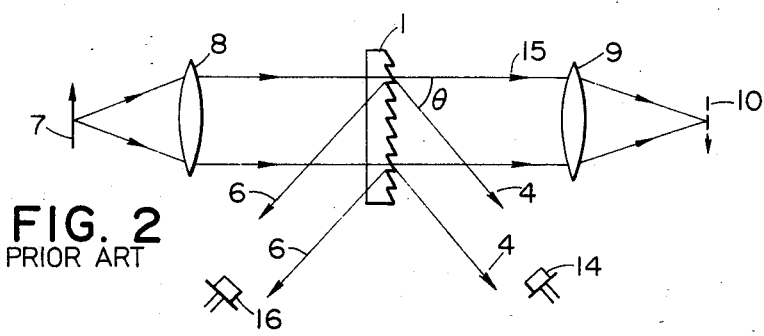
FIG. 2 is a sectional view of a light measuring device employing a beam splitter formed of a relief type diffraction grating.

FIG. 2 schematically shows a light measuring apparatus having the relief type diffraction lattice shown in FIG. 1 and disposed in the image forming optical system.

The image forming optical system shown in FIG. 2 is intended to form an image 10 of an object 7 through lenses 8 and 9. The diffraction lattice 1 is disposed in the optical path of the image forming optical system. When one wishes to measure light using the N-order transmission diffracted light 4 there is provided a photo detector 14. On the contrary, if one wishes to measure light making use of the N-order reflection diffracted light 6, then there is provided a photo detector 16. For the purpose of explanation, a further description will be made hereinafter in connection with the former case.

For the above image forming system it is required to locate the photo detector out of the optical path of the image forming beam. Otherwise, the function of the image forming system may be adversely affected by the photo detector. Furthermore, it is required for the diffracted light to be diffracted in the direction toward the outside of the lens 9.

The term "image forming beam" used herein means a beam of light containing information of the object image irrespective of whether the beam is before or after the object image plane. Therefore, in the case of a single lens reflex camera, both the beam reaching the film plane and the beam passing through the view finder are the "image forming beam".

In the beam splitter disclosed in the above-mentioned Japanese Patent Application laid open No. 42,042/1978, the first-order diffracted light has been used as diffracted light to be split for measuring light. The reason for this is, as described in the above patent specification, that with any blazed diffraction lattice already known in the art it is extremely difficult to selectively increase only the diffraction efficiencies of two diffracted lights whose orders of diffraction are not adjacent to each other, as compared with other diffracted lights.

In general, when light is split at an angle of diffraction $\theta$ using a diffraction lattice having a pitch d, the pitch d and the angle of diffraction $\theta$ in the order of N hold the following relation therebetween:

$$d \sin\theta = N\lambda (\lambda: \text{wavelength of the incident light}) \quad (1)$$

As readily understood from the above equation, the diffraction angle $\theta$ and the pitch d become smaller with lower order N of the diffracted light used for measuring light. However, since the diffracted light used for measuring light must be split in the direction away from the image forming beam, the angle of diffraction $\theta$ can not be so small. For example, an angle of about 30° will be required for $\theta$. For this reason, if a lower order of diffraction light is to be used for measuring light, it is required to reduce the pitch d. As an example, mention is made of the beam splitter described in the examples of the above-referred Japanese Patent Application laid open No. 42,042/1978 specification. In these examples, zero-order transmission diffracted light has been used for forming images and the first-order of diffracted light for measuring light (N=1). In this case, if a person wishes to split the incident light to obtain a measuring beam diffracted at the angle of diffraction $\theta = 30°$ and having the wavelength $\lambda = 0.55$ μm, then it will be required to use a diffraction lattice having a very small value of pitch d which is calculated to be 1.1 μm according to the above equation (1). Diffraction lattice of such fine pitch needs a very high standard of manufacturing technique. This leads to cost increase in mass production and therefore this is undesirable.

If a person can obtain a higher order of reflection diffracted light than the secondary as the split beam while suppressing the generation of diffracted lights of lower orders than that, it will moderate the severe requirements imposed on the relief type diffraction lattice and make it possible to provide a beam splitter which is easy to manufacture. An invention made for this purpose is the subject of earlier filed application, Japanese Patent Application No. 10,190/1979 (the counterpart of which is assigned to the assignee of this case U.S. Pat. No 4,486,072). The beam splitter proposed by the earlier filed invention will be described hereinafter with reference to FIG. 3.

In order to make such a beam splitter adaptable to a light measuring device in a photographic camera or the like, the diffraction lattice of the beam splitter is required to have an efficiency of zero-order transmission diffraction higher than 90% and a diffraction efficiency of several % for N-order transmission or reflection diffracted light used as the measuring beam.

Furthermore, it is required to keep the diffraction efficiencies in other orders at a level of about zero. The reason for this is that such diffracted lights in other orders produce ghost images and/or the undesirable phenomenon of flare.

Figure 3:
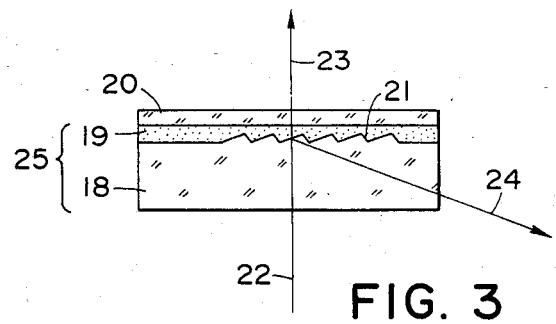
FIG. 3 is a sectional view of an improved relief type diffraction grating of a beam splitter.

Now, referring to FIG. 3. showing an example of the beam splitter disclosed in the above-mentioned earlier application, Japanese Patent Application No. 10,190/1979, the beam splitter comprises a plurality of semireflecting oblique surfaces arranged at very fine pitches. Designated by 18 is an optical transparent body of refractive index $n_1$ and having a relief type diffraction lattice carved on the surface of the transparent body. The transparent body 18 may be, for example, acryl, polystyrene or polycarbonate. Designated by 19 is a layer of a bonding agent (for example, of epoxy resin system). The thickness of the bonding agent layer 19 is sufficient enough to embed the relief diffraction lattice in the layer. The refractive index of the bonding agent 19 is the same as that of the transparent body 18.

Designated by 20 is another optical transparent body made of a material similar to that of the transparent body 18. The two optical transparent bodies 18 and 20 are cemented together by the bonding agent 19 to form a unitary beam splitter 25. The relief type diffraction lattice has a reflecting film layer 21 of silicon oxide or titanium oxide applied onto the surface of the lattice by vapour depositing the dielectric material. The reflecting film layer 21 has a certain designed reflection factor.

Assuming that the beam splitter 25 described above is disposed in the vicinity of the focus plane of the finder of a single lens reflex camera, a beam of light 22 coming from an object is incident upon the beam splitter 25. A portion of the incident light 22 will be reflected by the reflecting film layer 21 on the relief type diffraction lattice and the remaining portion will pass through the beam splitter as indicated by arrow 23. The reflected beam upon the reflecting film 21 is subjected to the phase difference owing to the relief structure of the reflecting film layer 21 so that a reflection diffracted light 24 is produced. In this case, the N-order reflection diffraction efficiency $\eta_{R(N)}$ can be obtained by the following equation:

$$\eta_{R(N)} = R \times \frac{\sin^2(NTP - \beta)}{(NTP - \beta)^2} = R \times \sin^2(NTP - \beta) \qquad (2)$$

$$\beta = 2TPn\Delta/\lambda \qquad (3)$$

However, it should be noted that the above is the approximation formula applicable to the case where the reflectance of the reflecting film 21 is used as R and the relief height $\Delta$ of the diffraction lattice is smaller than the pitch d.

Figure 4:
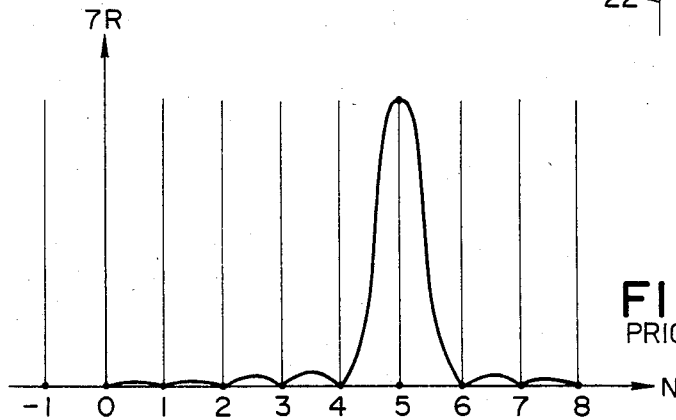
FIG. 4 is a graph showing the efficiency of reflection diffraction obtained by the beam splitter shown in FIG. 3.

If the fifth order reflection diffracted light is to be used as the light measuring beam the relief height is determined for the phase difference $\beta = 5TP$ and the surface of the diffraction lattice is contoured using the determined relief height. When the diffraction lattice is formed in this manner, the reflected light by the diffraction lattice contains only the fifth order reflection diffracted light 24 and does not contain any other order reflection refracted light as demonstrated by the graph in FIG. 4. In this case, the diffraction efficiency for the fifth order reflection diffracted light 24 becomes $\eta_R(5) = R$ in accordance with the above formula (2). Accordingly, a measuring beam having a certain desired intensity can be obtained by suitably determining the reflection factor of the reflecting film 21. Since the measuring beam is a fifth order diffracted light, the diffraction lattice used in the beam splitter is allowed to have a pitch five times broader than that required for the case where a first order refracted light is used as the measuring beam.

As for the transmitted light in FIG. 3, it will be seen that $(1-R)\%$ of the incident light 22 upon the beam splitter 25 excluding the above mentioned reflection diffracted light can pass through the beam splitter 25 providing that there is no loss of light in the medium or by reflection on any other surface than the reflecting film 21.

In the prior art beam splitter, since the transparent body 18 and the bonding layer 19 have the same refractive index, there is produced no phase difference in the transmitted light by the relief structure of the diffraction lattice. Therefore, no other diffraction light than zero-order is generated and the transmitted light is substantially composed of only zero-order transmission diffracted light containing the information of image.

Figure 5:
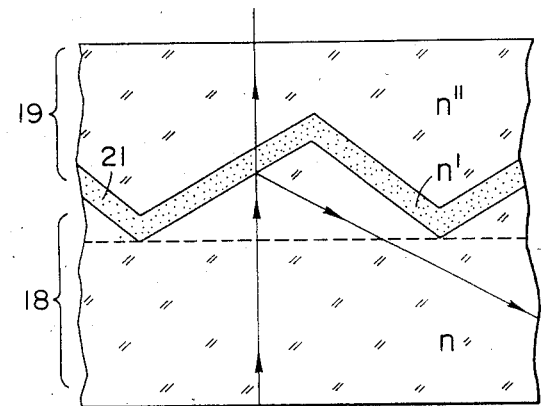
FIG. 5 is an enlarged sectional view of the beam splitter shown in FIG. 3.

FIG. 5 is a partly enlarged view of the relief type diffraction lattice shown in FIG. 3.

It is clearly seen in FIG. 5 that the beam splitter exclusively obtains the higher order reflection refracted light necessary for measuring light and the zero-order transmission diffracted light necessary for forming images, and that the beam splitter never generates any other unnecessary diffracted light. Regarding the two necessary diffracted lights, it is possible to control the ratio of the diffraction efficiency for one of the two diffracted lights and that for the other, by suitably selecting the reflection factor of the reflecting film 21.

A further detailed description of the above and other features of the beam splitter has been made in the specification of the above application, Japanese Patent Application No. 10,190/1979.

In summary, the above described beam splitter is featured by the provision of means for rendering the diffraction lattice surface a reflecting surface and means for controlling the phase difference of the light transmitted through the reflecting surface. Any desired high order reflection diffracted light can be obtained by virtue of the particular reflecting surface. The beam splitter produces no harmful light other than the desired split light by virtue of the latter mentioned means. An important advantage of the beam splitter is found in that a relatively large split angle is attainable even when there is used a diffraction lattice of a relatively gentle pitch. Another advantage is that the beam splitter can easily be manufactured in mass production.

An application form of the above beam splitter will be described hereinafter in connection with a photo metering device in a single lens reflex camera.

Figure 6A:
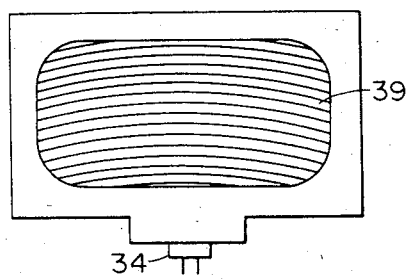
FIGS. 6A and 6B show, in plan and in section, respectively, a beam splitter used in a light measuring device.
Figure 6B:
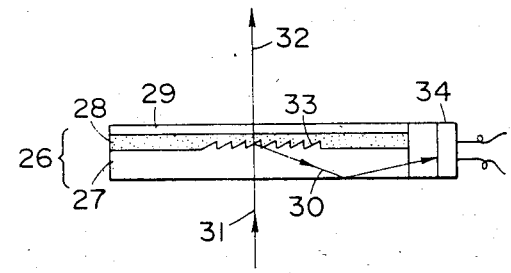

FIGS. 6A and 6B show, in plan view and in sectional view, respectively, such a beam splitter which is very useful for obtaining the necessary split beam and advantageously adaptable to a light measuring device.

Designated by 30 is a reflection diffracted light split as the measuring beam. In the shown beam splitter, the split measuring beam 30 is guided to a photo detector 34 while being subjected to total reflection by the inside surface of the transparent body 27. Therefore, in this case, the angle of diffraction for the reflection diffracted light must be determined depending upon the conditions necessary for the total reflection.

Since the light transmission element and the diffraction lattice are united together, the above beam splitter making use of total reflection can be conveniently mounted in an optical apparatus.

As shown in FIG. 6A, the lattice lines 39 are curved so as to make the split light from the respective points incident on the photo detector 34 with a high efficiency. With this arrangement, the beam splitter shown in FIG. 6, when it is disposed in the image forming beam within a camera, can direct a portion of the image forming beam split by it to the photo detector to measure the intensity of the image forming beam.

In measuring light in a photographic camera or the like, it is essential to carry out the measurement keeping a proper correspondence with the distribution of brightness of an object to be taken. In other words, the intensity of the image forming beam should be performed without any excess or deficiency relative to the brightness distribution of the object. In this respect, the prior art beam splitter described above involves some problems. The beam splitter is provided with a relief type diffraction lattice to obtain a reflection diffracted light as the measuring beam. Here, note should be taken to the fact that the reflection factor of the beam splitting surface in the beam splitter is constant and uniform throughout all the area of the surface. When the measuring beam is taken up using such relief type diffraction lattice having a constant reflection factor there arise some problems of which a detailed description will be made hereinafter with reference to FIG. 7.

Figure 7A:
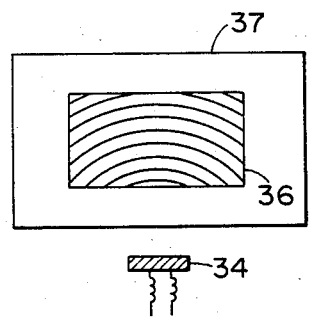
FIGS. 7A and 7B are plan views for illustrating the problems involved in measuring light on the basis of the distribution of measurements in a beam splitter whose grating is uniform in reflection factor.
Figure 7B:
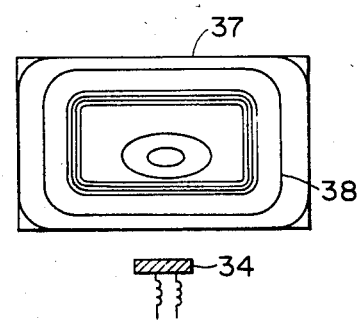

FIG. 7A is a plan view of the light measuring device of a single lens reflex camera in which a prior art beam splitter is used. Designated by 37 is the whole area of the measuring visual field. Within the area 37 there is a particularly defined area 36 in which a relief type diffraction lattice is provided. The diffraction lattice is formed of a reflecting surface having a uniform reflection factor. But, the lattice lines are curved nearly concentrically so as to concentrate the split diffracted light onto a photo detector 34. In this light measuring device employing a prior art beam splitter, there is produced a distribution of measuring sensitivity to the light introduced into the photo detector 34. The sensitivity distribution which occurs in this case is dependent on the positions of the beam splitter. FIG. 7B shows the measuring sensitivity distribution.

In FIG. 7B, the sensitivity distribution within the whole area 37 of the measuring visual field is shown by solid lines 38 which are contour lines indicating the levels of the measuring sensitivity lowering ½ by ½ at every line. As will be seen from the distribution of light measuring sensitivities, the beam splitter brings about the following two important problems in measuring light for a camera:

(i) The peak of the measuring sensitivity to light appears not at the center of the visual field but at a position deviated from it toward the photo detector.

(ii) An abrupt change in measuring sensitivity appears in the vicinity of the boundary between the part having the reflecting film applied thereto and the part having no reflecting film applied.

The reason for the problem (i) is that the measuring sensitivity becomes higher with larger angle to the photo detector from a point on the measuring plane. The second problem (ii) is caused by the difference between presence and absence of a reflecting film. The abrupt change in sensitivity reflects the difference directly.

The problem (ii) of abrupt sensitivity change may be minimized by uniformly reducing the reflection factor. However, by doing so there will be caused another problem that the sensitivity of the light measuring device is reduced as a whole. For this reason, it has been difficult to prevent such abrupt change in sensitivity while maintaining the sensitivity of the total light measuring device at a sufficiently high enough level to meet the requirement in measuring light in a single lens reflex camera.

Due to the above two problems, the use of a reflecting film uniformly applied makes the measuring sensitivity distribution undesirable for the so-called average light measurement with emphasis on the central area. With the arrangement of the prior art beam splitter, it is difficult to attain the measurement of light in a proper correspondence with the distribution of brightness of an object.

However, in measuring light in a single lens reflex camera or the like, it is essential to perform the measurement in such a manner as to correctly correspond to the brightness distribution of an object to be photographed. To attain this, it is required to make the measured light have a particularly determined distribution.

The present invention is directed to a solution to the above problems. According to the invention, a desirable distribution of beam splitting rate within the beam splitting surface can be realized without any adverse effect on the image forming beam transmitted through the beam splitter. Also, when the present invention is applied to a light measuring device, the most desirable distribution of light measuring sensitivity can be realized.

FIG. 8 shows an embodiment of the present invention wherein the relief type diffraction lattice of the beam splitter is divided into sections within the beam splitting surface. The reflection factor of the reflecting surface of the lattice is varied from a section to the next section to obtain a desired distribution of beam splitting rate. Alternatively, the reflection factor is varied continuously within the beam splitting surface so as to obtain the desired distribution of beam splitting rate. Thus, when used in a light measuring, it realizes a desirable weighting of measured light on the light measuring surface.

Figure 8A:
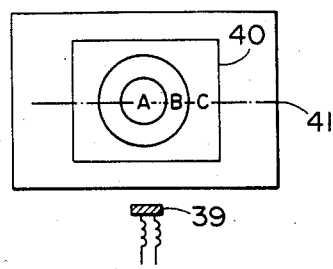
FIG. 8A shows a device in which the reflection factor of the grating changes stepwise.
Figure 8B:
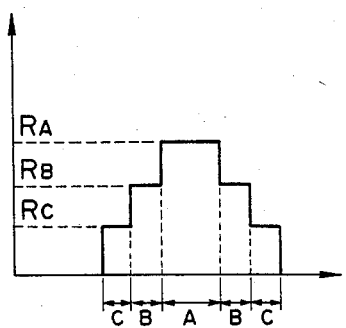
FIG. 8B is a graph showing the reflection factor distribution thereof.

The beam splitter shown in FIG. 8A is different from that shown in FIG. 6 in that the beam splitting surface formed by applying a reflecting film layer on the diffraction lattice is divided into three sections. Namely, the light measuring area 40 is divided into the three zones, A, B and C in this order as viewed from the center of the area. The reflection factor of the reflecting film is varied from one zone to the next zone. The reflection factor in A zone is $R_A$, that in B zone is $R_B$ and that in C zone is $R_C$. The distribution of reflection factor on the section X—X' is shown in FIG. 8B. As seen in FIG. 8B, the reflection factor of the reflecting film is reduced stepwise in the order of A, B and C. Such reflecting film is provided in accordance with the feature of the invention. In the FIG. 39 is a photodetector.

Viewability through finder will be affected by the provision of such reflecting film. This effect must be taken into consideration. In the case where the beam splitter is disposed in the vicinity of the focal plane in the finder optical system, when a person views an object through the finder, the view field is apt to become dark at the portion of light measuring area. This is because a portion of light is taken out by the reflecting film. In particular, when the reflecting film is applied onto a portion of the finder visual field, the border area between the portion having the reflecting film thereon and the portion having no reflecting film is accentuated so that the portion having the reflecting film is made darkened and shadowed, which is undesirable for observing the object.

The degree of this darkening varies depending on the difference in reflection factor between different zones and the distance from the beam splitter to the focal plane in the finder optical system. By making the boundary obscure when the reflecting film is applied, the boundary can not be made perceivable to the eye through the finder. This will be described in detail with reference to FIG. 9.

Figure 9:
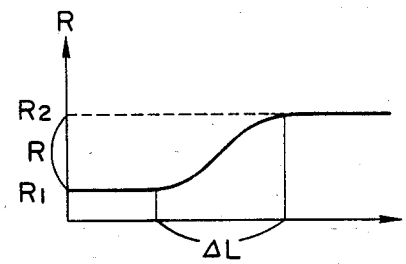
FIGS. 9 and 10 are graphs for illustrating the condition necessary for making invisible through the finder the boundary between two neighboring zones having different reflection factors when the beam splitter is located in the vicinity of the focal plane.

In FIG. 9, R is reflection factor, and $R_1$ and $R_2$ are reflection factors at two different points on the beam splitting surface, that is, the light measuring plane. $\Delta L$ is the distance between the two different points on the plane. FIG. 9 shows that the reflection factor changes from $R_1$ to $R_2$ between the two different points spaced by the distance $\Delta L$ from each other. For the purpose of explanation it is assumed that $R_2 > R_1$. Further, it is assumed that the distance from the beam splitter to the focal plane in the finder optical system is $\delta$. Namely, $\delta$ stands for the amount of shift between the focal plane and the light measuring plane. We have conducted experiments to find out the conditions under which the boundary portion between the area of the reflection factor $R_1$ and the area of the reflection factor $R_2$ is no longer perceivable to the eye through the finder. The results of the experiments are shown in FIG. 10 wherein $R_2 - R_1 = \Delta R$.

Figure 10:
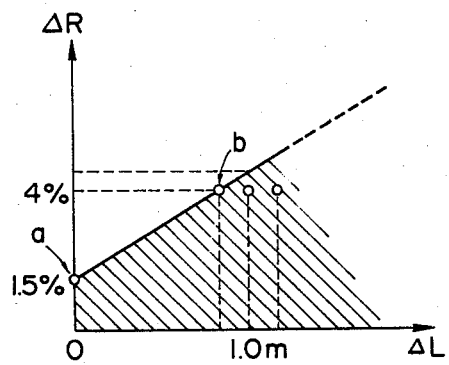

The results shown in FIG. 10 were obtained from the experiments in which the beam splitter was positioned near the focal plane like the case of so-called focal plane photo metering. Under this condition, we have conducted the experiments to find out the requirements necessary for making the boundary area between two zones having different reflection factors not perceivable to the eye through the finder.

In FIG. 10, the mark o shows the conditions actually found by using samples prepared for experiments. Under the conditions marked by o, the experiments have demonstrated that no visible shadow appears in the view field of the finder. As compared to the case where the distance between the two different points, $\Delta L$ is 0 with the case where $\Delta L$ is 0.8 mm, the difference in reflection factor is $4 - 1.5 = 2.5\%$. Since this difference is very small, the allowable difference $\Delta R$ for no perceivable shadow can be represented by a linear approximation of $\Delta L$. From the condition necessary for the distance between two points found by the experimental values a and b in FIG. 10, the condition required for $\Delta R$ is given by:

$$\Delta R \leq 3.13 \times \Delta L + 1.5 (\%) \tag{4}$$

The hatched area in FIG. 10 satisfies the above condition (4). For instance, if $\Delta L = 1.0$ mm, then $\Delta R \leq 4.63\%$. As shown in FIG. 1, in view of the function of the beam splitter it is desirable that the quantity of the light transmitted through the beam splitter be more than 90% of the incident light. Therefore, it is preferred that $\Delta R$ be in the order of several % at most.

To set $\Delta L$ to 1 mm means that some blur should be given to the boundary between two zones having different reflection factors in the reflecting film layer. If the reflecting film layer is applied to the diffraction lattice employing the technique of vacuum vapour deposition, such blurring is obtainable by keeping a certain determined distance between the mask for vapour deposition and the lattice surface and carrying out the vapour deposition while maintaining a relative rotational motion between the material to be deposited and the sample to which the reflecting film layer is to be applied. In the reflecting film formed in this manner, the boundary between the adjacent zones having different reflection factors is blurred. By $\Delta L = 1.0$ mm it is meant that the amount of such blur is 1 mm.

When no blur is given to the boundary, namely when $\Delta L = 0$, the difference in reflection factor, $\Delta R$ may be a value less than 1.5% from the above formula (4). Even when no blur has been given to the boundary in this case, the boundary is not perceivable so long as the difference in reflection factor, $\Delta R$ is less than 1.5%. This is because such a small difference in reflection factor is easily moderated by the action of diffusion of the focussing plate and the difference between bright and dark on the measuring plane can be reduced to a level lower than the sensitivity of the human eye.

Figure 11:
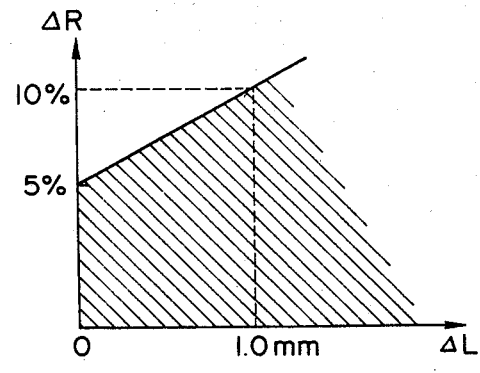
FIG. 11 is a graph for illustrating the condition necessary for making the boundary invisible when the beam splitter is located at a position 10.0 mm departing from the focal plane.

FIG. 11 shows the conditions necessary for making the boundary unperceivable to the eye when the amount of shift between the light measuring plane and the focal plane, $\delta$ is large, for example, $\delta = 10$ mm.

The hatched area in FIG. 11 shows the necessary condition, which is perceivable to the eye:

$$\Delta R \leq 5 \times \Delta L + 5 (\%) \tag{5}$$

For $\delta = 10$ mm, the reflection factor difference $\Delta R$ up to 5% is tolerable even when no blur is given to the boundary portion, that is, even when $\Delta L=0$.

Further, with increasing the amount of shift $\delta$, a larger tolerable reflection factor $\Delta R_T$ for $\Delta L=0$ mm is obtainable. Accordingly, whether blur $\Delta L$ is necessary or not depends upon the distance from the beam splitter to the focal plane in the view finder optical system. Thus, one can prevent the measuring area from being shadowed, by suitably selecting the amount of blur $\Delta L$ in accordance with the location of the beam splitter relative to the focal plane. Therefore, when the beam splitter according to the present invention is to be used in a light measuring device within a camera, it is desirable that the amount of blur $\Delta L$ at the area where the reflection factor changes and the difference in reflection factor $\Delta R$ should satisfy the above conditions (4) and (5).

In the shown embodiment, it is not necessary to change the reflection factor throughout the whole reflecting surface. In a cross-section of the diffraction lattice shown in FIG. 5, the reflecting surface effective to form the split beam necessary for measurement is only the obliquely disposed reflecting surface. It is necessary and sufficient for the above purpose that the change of reflection factor be made only to the oblique effective reflecting surface. Reflection factor of the remaining surface has no effect on the distribution of measured light.

FIG. 12 illustrates another embodiment in which the reflection factor at the boundary between every two neighboring zones is changed continuously.

Figure 12A:
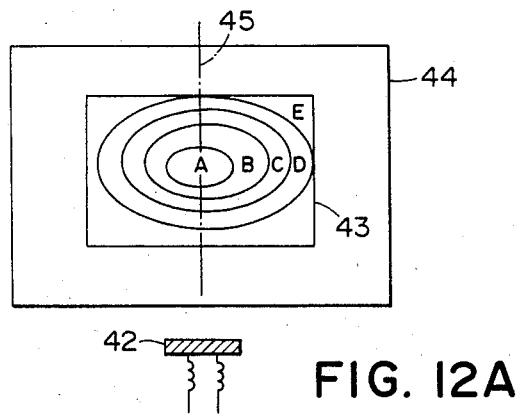
FIG. 12A shows a device in which the reflection factor changes gently at the area near the boundary between zones.

In FIG. 12A, reference numeral 43 designates a reflecting film area which is divided into five zones A, B, C, D and E. These five zones have different reflection factors $R_A$, $R_B$, $R_C$, $R_D$ and $R_E$, respectively, as shown in FIG. 12B, in which 42 is a photo detector and 44 designates the frame of measuring visual field.

Figure 12B:
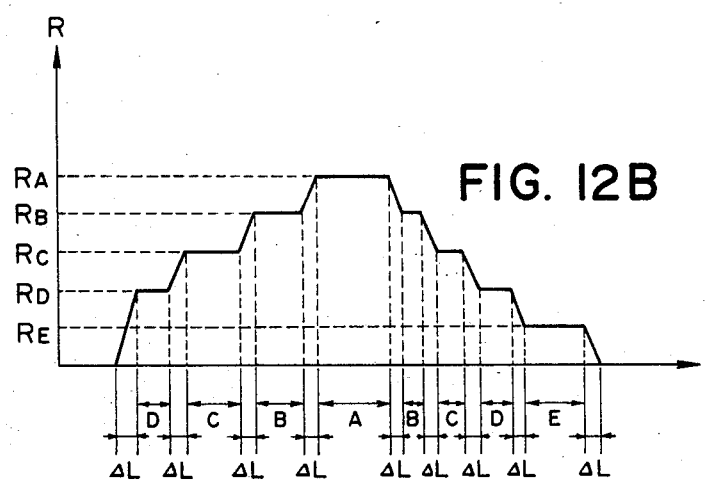
FIG. 12B is a curve showing the reflection factor distribution thereof.

FIG. 12B shows the distribution of reflection factors along the section 45 on an axis selected based on the photo detector. The rightward direction of the abscissa is the direction toward the photo detector 42.

Figure 12C:
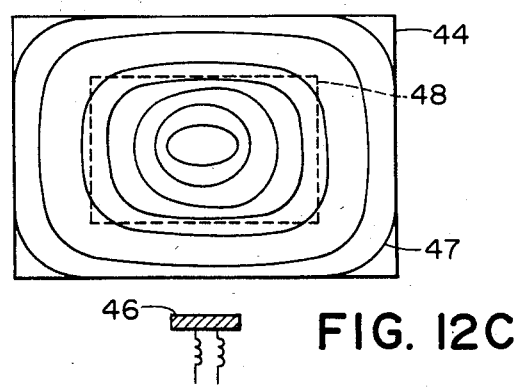
FIG. 12C shows the distribution of measurements thereof.

As seen in FIG. 12B, the respective zones are asymmetrical relative to the center of the light measuring surface when viewed in the direction toward the photo detector and in the direction away from it with regard to the same zone having the same reflection factor. In this embodiment, the zones are arranged in such a manner that in the direction toward the photo detector the reflection factor drops more sharply than in the direction away from the photo detector. The reason for this is that in the prior art device, as shown in FIG. 7B, the peak of light measuring sensitivity appears at a position deviated from the center of the measuring view field toward the photo detector. The arrangement of zones in this embodiment has an effect to correct such deviation of the sensitivity peak and make it coincident with the center of the view field. FIG. 12C shows the sensitivity distribution obtained when $R_A=4.5\%$, $R_B=4\%$, $R_C=3.5\%$, $R_D=2\%$ and $R_E=1\%$ and when $\Delta L=0.5$ mm is provided between every two neighboring zones as the width of reflection factor changing area.

In FIG. 12C, the photo detector is designated by 46. Lines 47 are contour lines of sensitivity. The peak of sensitivity lies at the center of the measuring visual field 44. Level drop from one contour line to the next one is $\frac{1}{2}$. As seen in FIG. 12C, the sensitivity gradually lowers from the peak at nearly constant pitch. In addition, there no longer occurs any abrupt change of measuring sensitivity at the boundary between the area having the reflecting film and the area having no reflecting film. Thus, such measuring sensitivity distribution as required for so-called central weighted average photo metering can be attained by this embodiment. Further, since the difference in reflection factor between every two zones is less than 5% and a reflecting changing area $\Delta L$ of 1.0 mm is provided between every two zones there is produced no shadow in the visual field of the finder. Also, since the reflection factor $R_A$ of the central portion is high which is 4.5%, the light measuring device has a high measuring performance as a whole.

The reflecting film layer having such reflection factor distribution as shown in FIGS. 12A and B may be formed on the surface of a diffraction lattice in the following manner;

By way of example, the known vacuum vapour deposition technique is used to form the reflection film.

(i) At first, vapour depositing masks are prepared. The respective masks are so prepared as to have forms corresponding to the shapes of the respective zones. This may be done by etching or machining. Each mask has a portion cut out at the area where the corresponding reflecting film is to be applied.

(ii) A reflecting film is vapour deposited as first using the mask corresponding, in form, to the zone E. After completing the first vapour deposition on the zone E, the mask for zone E is replaced by the next mask for zone D. Again, a reflecting film is vapour deposited using the mask having a form corresponding to the shape of zone D. This procedure is repeated until the last film deposition using the mask for zone A is completed. Thus, there is obtained a desired reflecting film on the relief type diffraction lattice. The reflecting film layer thus formed on the lattice has a reflection factor distribution as shown in FIG. 12B.

To provide a reflection factor changing area $\Delta L$ in an amount of 0.5 mm as shown in FIG. 12B, the deposition mask and the sample are joined together keeping a space of about 1 mm therebetween at each the above vapour deposition steps. During the vapour deposition, the two joined members are rotated relative to the source of material to be vapour deposited. In this manner, the desired amount of reflection factor changing area $\Delta L$ can be provided.

Generally, the contour which the applied reflecting film should have, and the number of zones can be selected as desired in accordance with the distribution of measuring sensitivity then desired. The only thing required therefore is that one should prepare depositing masks corresponding to the selected contour of the reflecting film to be formed.

If one wishes to decrease the number of contour lines of measuring sensitivity in the sensitivity distribution shown in FIG. 12C, it may be attained by suitably changing the reflection factors of the individual zones. For example, $R_A/R_E=4.5$ in the embodiment shown in FIG. 12B can be changed to $R_A/R_E=2.67$ using $R_A=4\%$ and $R_E=1.5\%$. On the contrary, when it is desired to increase the number of contour lines, it can be attained by reducing the ratio of $R_A/R_E$, for example, to $R_A/R_E=10$ using $R_A=5\%$ and $R_E=0.5\%$. In this manner, the amount of change in measuring sensitivity also can be varied from place to place as desired.

In summary, the present invention provides a high degree of freedom in setting of:

(1) peak position of measuring sensitivity;
(2) form of sensitivity contour lines; and
(3) density of sensitivity contour lines.

In addition, the present invention realizes such a beam splitter which does not produce any shadow of measuring area observable through the finder.

The present invention is not limited to the embodiment shown in FIG. 12. In the light of the above teachings, it is also possible to realize easily such a distribution of measured light in which the sensitivity peak is somewhat shifted downward the center of the measuring visual field and the sensitivity contour lines are spaced from each other at nearly equal intervals. Such characteristics of the sensitivity distribution may be useful for a camera, especially a single lens reflex camera, when one considers the case wherein a bright object such as the sky appears at the upper area in the measuring visual field.

FIG. 13 shows a modification of the embodiment shown in FIG. 12B. In this modification, the reflection factor is varied continuously throughout the whole measuring plane.

Figure 13A:
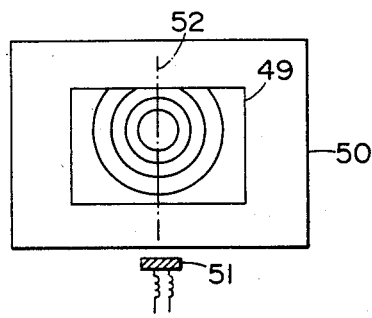
FIG. 13A shows a device in which the reflection factor changes continuously.
Figure 13B:
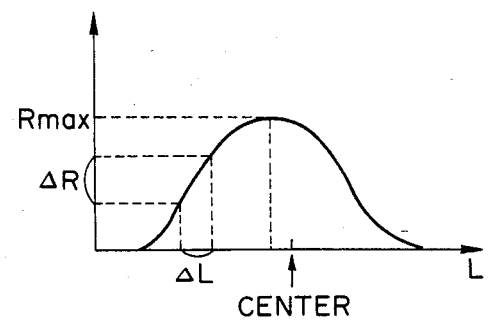
FIG. 13B is a curve showing the reflection factor distribution thereof.

In FIG. 13A, the area designated by 49 is an area having a reflecting film applied thereto, 51 is a photo detector and 50 designated the measuring visual field. FIG. 13B shows the relation between position L on the measuring surface and reflection factor along the section 52 in FIG. 13A. On the abscissa L in FIG. 13B, its plus side is in the direction toward the photo detector 51. In this embodiment, the reflection factor of the reflecting film continuously changes on the measuring surface. Further, the reflecting film is so formed that the maximum of the reflection factor appears at a position shifted from the center of the visual field in the direction away from the photo detector.

Figure 13C:
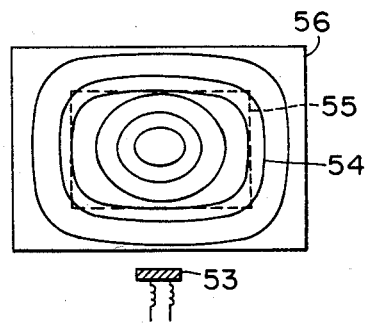
FIG. 13C shows the measurement distribution thereof.

To make the measuring area so as not to be perceivable to the eye through the finder, it is required to keep the gradient $\Delta R/\Delta L$ lower than the certain critical value. In FIG. 13B, $\Delta L$ is the distance between two points on the measuring surface and $\Delta R$ is the reflection factor difference between the two points. The condition required is that the maximum value of the gradient $\Delta R/\Delta L$ should be less than 3.13%/1 mm. If the reflection factor is continuously changed with the maximium gradient of change being less than 3.13%/1 mm, then the measuring area will become almost not perceivable to the eye when viewed through the finder. FIG. 13C shows the distribution of measuring sensitivity obtained therefrom. This sensitivity distribution is particularly suitable for the average photo metering with weight on the central area.

The reflecting film in which the reflection factor changes continuously may be formed employing a suitable known method. When the vacuum vapour deposition technique is used to make such reflecting film a depositing mask is positioned between the source of material to be deposited and the sample of relief type diffraction lattice and then vapour deposition is carried out while rotating them. The depositing mask used in this case is so shaped as to shield the sample from the vapour deposited material at a gradually increasing rate with the increase of distance from the center of rotation.

In case of the device according to the embodiments described above, a desired distribution of measured light can be obtained by stepwise and/or continuously changing the reflection factor of a reflecting surface on a relief type diffraction lattice so as to give weight to the measured light as desired.

The reflection factor can be changed zone by zone. In this case, the effective reflecting surface is divided into zones. Alternatively, the reflection factor can be changed continuously throughout the whole area of the effective reflecting surface. In any case, the desired distribution of measured light can be realized in such a manner that the light measuring area is not perceivable to the eye through the finder. The desired distribution of measured light is never limited only to that for the central weighted average light measuring. The device according to the above embodiments is also applicable to so-called partial light measuring. If there is required only such light measurement in which it is desired not to hinder the viewability through the finder, the shape and form of the respective zones can be selected with a considerably large freedom in design.

According to another aspect of the invention, a desired distribution of light splitting rates is formed by varying, within the measuring area, the angle of inclination of a plurality of semireflecting oblique surfaces constituting a beam splitter in such a manner as to give desirable weight to the measured light. This aspect of the present invention will be described in detail as the second embodiment of the present invention with reference to FIGS. 14 through 20.

Figure 14:
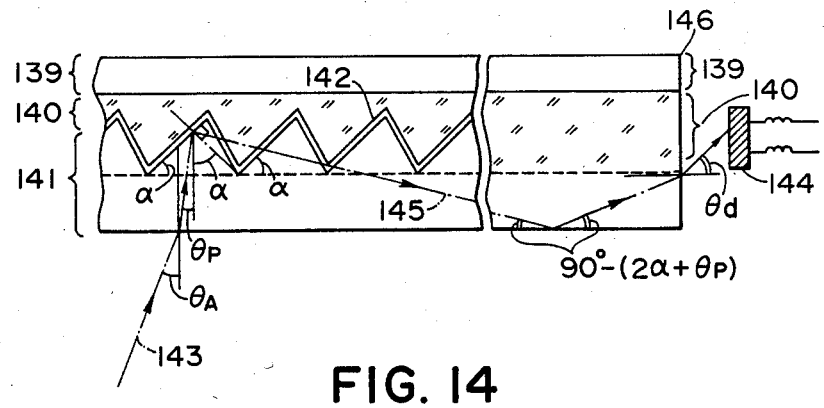
FIGS. 14 and 15 illustrate the change of quantity of light incident on a photo detector with the change of exit angle of the split light from the exit end surface of a beam splitter.
Figure 15:
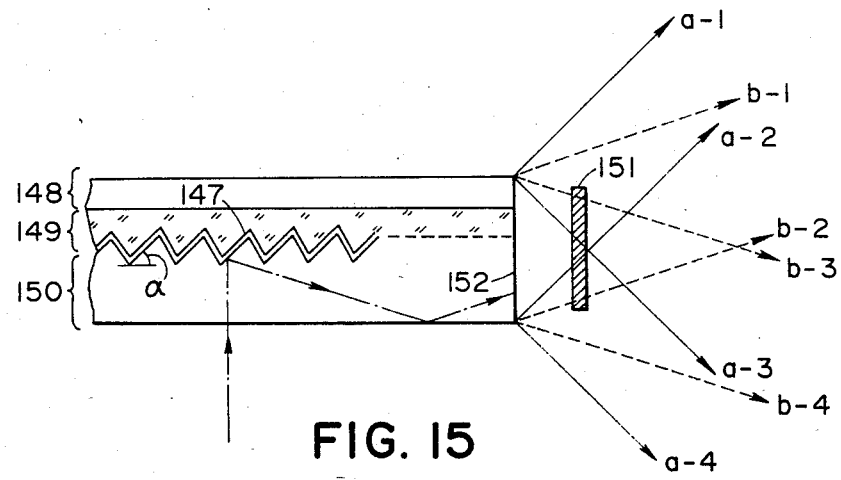

FIGS. 14 and 15 illustrates the principle of the system to which the present invention relates.

FIG. 14 is an enlarged cross-sectional view of a beam splitter taken along a line substantially normal to the diffraction lattice lines. Designated by 143 is a light incident on the beam splitter, 142 is a reflecting film, 140 is a layer of adhesive, 141 is an optical transparent body on which the lattice is provided, 139 is another optical transparent body. Let $\theta_A$ denote the incident angle in air of the light entering the beam splitter and $n_1$ the refractive index of the transparent body 141 having the lattice provided thereon. Then, the incident angle $\theta_P$ in the beam splitter of the light entering the relief type diffraction lattice will be given by:

$$\theta_P = \sin^{-1}\left(\frac{\sin\theta_A}{n_1}\right) \tag{6}$$

Let the inclination angle of the relief type lattice be $\alpha$. Then, the light reflected by the reflecting film on the lattice will repeat total reflection upon the upper and lower surfaces of the beam splitter and travel forming an angle of about $90° - (2\alpha + \theta_P)$ with the upper and lower boundary surfaces. The light emerging from the end surface 146 is incident upon a photo detector 144. When $\alpha \leq 45°$, the exit angle $\theta_d$ of the light emerging from the end surface 146 of the beam splitter is given by:

$$\begin{aligned}\theta_d &= \sin^{-1}[n_1 \sin\{90° - (2\alpha + \theta_P)\}] \\ &= \sin^{-1}\{n_1 \times \cos(2\alpha + \theta_P)\}\end{aligned} \tag{7}$$

When the light is incident normal on the beam splitter, that is when $\theta_A = \theta_P = 0°$, the formula (7) becomes:

$$\theta_d = \sin^{-1}\{n_1 \cos(2\alpha)\} \tag{8}$$

As seen from the above equations (7) and (8), the larger the inclination angle $\alpha$ of the lattice is, the smaller the exit angle $\theta_d$ becomes. For instance, if $n_1 = 1.49$, the exit angle $\theta_d$ becomes 35.6° when the inclination angle $\alpha$ is 33.5°, and the exit angle $\theta_d$ becomes 21.1° when $\alpha$ is 38° in accordance with the above formula (8).

For inclination angle $\alpha$ larger than 45°, the above equations (7) and (8) may be rewritten as follows:

$$\theta_d = \sin^{-1}[n_1 \sin\{(2\alpha + \theta_P) - 90°\}] \quad (9)$$
$$= \sin^{-1}\{-n_1 \cos(2\alpha + \theta_P)\}, \text{ and}$$

especially, when $\theta_A = \theta_P = 0°$, $$\theta_d = \sin^{-1}\{-n_1 \cos 2\alpha\} \quad (10)$$

In this case also it is possible to control the exit angle $\theta_d$ by suitably selecting the inclination angle of lattice, $\alpha$.

The exit angle $\theta_d$ and the quantity of light reaching the photo detector have a correlation of which an explanation will be made hereinafter with reference to FIG. 15.

FIG. 15 is a view for illustrating a comparison of the quantity of light reaching the photo detector for a value of the exit angle $\theta_d$ with that for another larger value of the exit angle $\theta_d$. In FIG. 15, the solid arrow line indicates the light with a larger exit angle $\theta_d$ and the broken arrow line does that with a smaller exit angle. To distinguish the former from the latter, reference characters a and b with reference numbers affixed are used to show the individual rays of the solid line and the broken line, respectively.

Among many rays of the light emerging from the exit end 152 of the beam splitter, only the upper and lower marginal rays are shown in FIG. 15 for the respective cases of the exit angle $\theta_d$. Therefore, it is to be understood that in the case of a larger exit angle $\theta_d$, the emerging light comprises a bundle of rays included between the marginal rays a-1 and a-2 and a bundle or rays included between the marginal rays a-3 and a-4. Similarly, in the case of a smaller exit angle $\theta_d$, the emerging light comprises a bundle of rays included between the marginal rays b-1 and b-2 and a bundle of rays included between the marginal rays b-3 and b-4.

The photo detector 151 is disposed spaced from the exit and 152 of the beam splitter. As clearly seen from FIG. 15, the quantity of light entering the photo detector 151 is larger in the case of small exit angle $\theta_d$ than in the case of large exit angle $\theta_d$. In other words, the quantity of light incident on the photo detector increases with decreasing the exit angle $\theta_d$. This means that the sensitivity on the measuring surface varies with the lattice inclination angle $\alpha$. As readily understood from the above equations (7) and (8), with increasing the inclination angle $\alpha$, the exit angle decreases and therefore the quantity of light entering the photo detector 151 increases. The second embodiment of the invention described hereinafter uses this characteristic. By changing the inclination angle of lattice $\alpha$ zone by zone on the measuring surface or continuously, a desired distribution of measured light is given to the beam splitter. According to this embodiment, the reflection factor of the reflecting film on the lattice can remain constant.

Figure 16A:
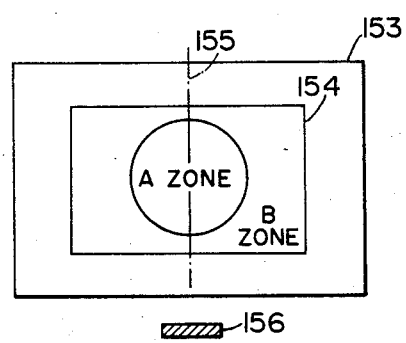
FIGS. 16A and 16B show, in plan and in section, respectively, a device in which the grating has different inclination angles in different zones.
Figure 16B:
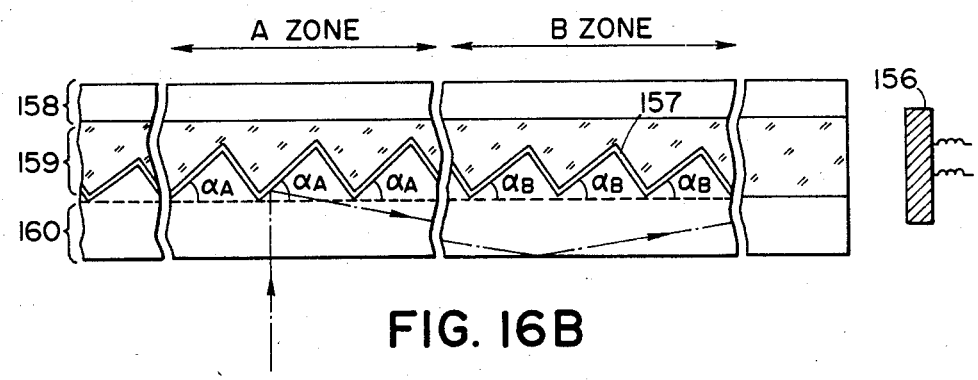

FIGS. 16A and 16B show another embodiment of the present invention.

In FIG. 16A, the measuring visual field designated by 153 includes an area 154 where a reflecting film is provided in the form of a relief type diffraction lattice. The area 154 is divided into two zones A and B. The zone A contains the center of the visual field and the zone B is outside the zone A, and 156 is a photo detector. FIG. 16B is an enlarged cross-sectional view thereof including the photo detector taken along the line 155 in FIG. 16A. $\alpha_A$ is the inclination angle of the lattice in the zone A and $\alpha_B$ is that in the zone B. The lattice is so formed as to satisfy the condition of $45° \geq \alpha_A > \alpha_B$. The reflection factor of the reflecting film is constant throughout the whole area including the zones A and B. Therefore, the measuring sensitivity of zone A is higher than that of zone B so that the distribution of sensitivity obtained is given a weight in sensitivity on its central portion. While in FIG. 16A the embodiment has been shown to have two zones, the form and number of zones may be selected suitably according to the desired distribution of measuring sensitivity.

The beam splitter according to the embodiment can be prepared in a simple manner by forming a relief type diffraction lattice from plastic material using a master pattern. In this case, the master pattern used may be prepared by assembling successively die for lattice of zone A, a die for the lattice of zone B and a die for the plane mirror in this order starting from the center side of the visual field.

In FIGS. 16A and 16B, reference numerals 158 and 160 designate two optical transparent bodies, respectively, and 159 is an adhesive layer.

Figure 17:
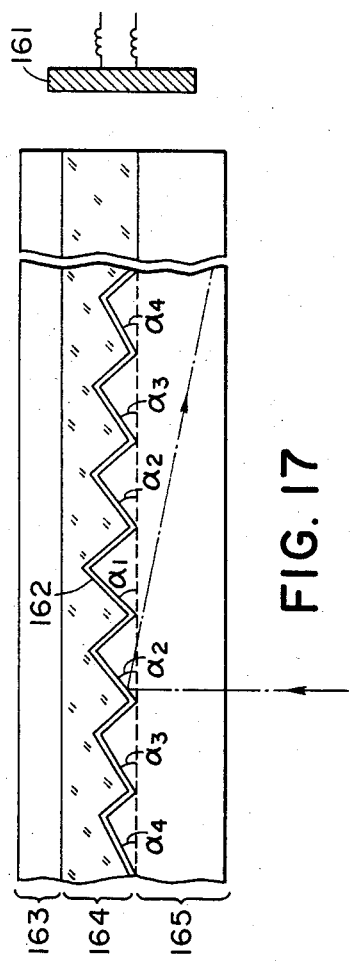
FIG. 17 shows a device in which the inclination angle of the grating changes continuously.

FIG. 17 shows another device in which the angle of lattice inclination is changed continuously at every pitch instead of changing the inclination stepwise zone by zone.

FIG. 17 is an enlarged cross-sectional view of the beam splitter taken along a line normal to the lattice lines in which $45° \geq \alpha_1 > \alpha_2 > \alpha_3 > \alpha_4$, and therefore the measuring sensitivity decreases gradually toward the edges of the measuring visual field. In this figure 163 and 165 are optical transparent bodies, 164 is a layer of bonding agent and 161 is a photo detector. In the case of this beam splitter, the die used as a master pattern for manufacturing the relief type diffraction lattice may be prepared by mechanically cutting the die blank using a diamond bit while changing the inclination angle of the bit to the die blank at every pitch during cutting The beam splitter of the present invention described above obtains any desired distribution of measured light in a light measuring device to which the beam splitter is applied. The distribution of beam splitting rates required to realize the desired distribution of measuring sensitivity can be obtained in a simple manner only by changing the inclination angle of lattice of the reflecting surface stepwise and/or continuously within the beam splitting surface. Thus, the reflecting surface of the relief type diffraction lattice of the beam splitter makes it possible to form split light at the desired rate.

According to a further aspect of the present invention, the area ratio of the semireflecting oblique surfaces contributable to beam splitting is changed in the light measuring surface to realize a desirably weighted sensitivity distribution for light measuring. This aspect of the present invention will be illustrated by the following embodiment.

Figure 18:
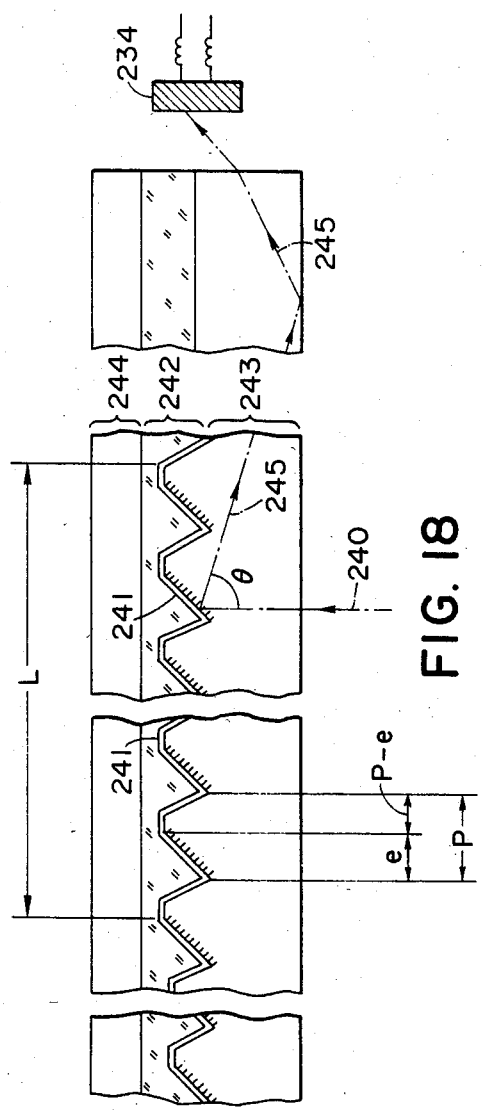
FIG. 18 is an illustration for explaining the surface area ratio of an effective reflecting surface in a zone.

FIG. 18 shows the structure of a relief type diffraction lattice used in this embodiment of the present invention. FIG. 18 is an enlarged cross-sectional view of the diffraction lattice including a photo detector 234 taken along a line substantially normal to the lattice lines.

Designated by 240 is an incident light on the diffraction lattice, 241 is a reflecting film, 242 is an adhesive layer, 243 is an optical transparent body on which the diffraction lattice is provided and 244 is another optical transparent body. The incident light 240 is reflected by the reflecting 241 and then subjected to total reflection upon the upper and lower boundaries of the beam splitter so as to guide the split light 245 to the photo detector 234 facing the exit end surface of the beam splitter. For the purpose of explanation, the surface of the relief type diffraction lattice effective to direct the incident light 240 toward the photo detector 234 is herein referred to as effective reflecting surface. In FIG. 18, the effective reflecting surface is indicated by hatching.

According to the third embodiment of the present invention, to weight the measured light on the measuring plane as desired, the area ratio of the effective reflecting surface is varied stepwise or continuously. For stepwise change, the area of the relief type diffraction lattice is divided into zones. The area ratio of the effective reflecting surface is varied stepwise from one zone to another so that different zones have different area ratios with respect to each other. For continuous change, on the contrary, the area ratio of the effective reflecting surface is varied continuously throughout the whole area of the lattice.

The term "area ratio" herein used means the ratio of effective reflecting surface per unit surface area. This ratio is defined on the basis of a certain determined length L in the cross section of the lattice substantially normal to the lattice line. The length L is sufficiently small as compared with the length of one side of the whole beam splitting area. For example, in the case of a beam splitter used in a light measuring device in a single lens reflex camera, the length L may be in the order of 1 to 2 mm. In the cross section shown in FIG. 18, let P denote the width of one pitch of the diffraction lattice and e denote the width of the effective reflecting surface in the one pitch. Then, if the number of lattice pitches present in the length L is Nge, the area ratio of this effective reflecting surface is given by Nge/L. However, it should be noted that the lattice shown in FIG. 18 is an example of such a lattice in which all of lattice lines are equal in pitch.

As seen in FIG. 18, the light incident on the portion (p−e) of the lattice can not be directed toward the photo detector 234 even when the light is reflected by the reflecting film 241. Therefore, this portion (p−e) can not make any direct contribution to light measuring.

Comparing FIG. 18 with FIG. 5, one can easily see that the relief type diffraction lattice shown in FIG. 18 has a flat portion particularly formed therein (at the crest of the relief in FIG. 18). The incident light on the beam splitter will enter this flat portion nearly normally to the flat portion. Therefore, even when a reflecting film layer is provided also on the flat portion, it produces almost no reflected light. Since the flat portion has no substantial contribution to beam splitting, the area ratio of the effective reflecting surface can be set to any desired value by suitably selecting the size of the flat portion. In this manner, according to this embodiment, weighting of the quantity of light incident on the photo detector can be attained by changing the percentage which the effective reflecting surface e occupies in the area of length L while maintaining the reflection factor of the reflecting film constant.

To change the area ratio of effective reflecting surface there may be employed another method than that described above. For example, the area ratio of effective reflecting surface may be varied by limiting the place to be covered by the reflecting film in different rates at every pitch. However, it has been found that the above mentioned method making use of the flat portion is most preferred. Therefore, in the following description, embodiments will be shown to have such a flat portion as shown in FIG. 18.

As previously mentioned, the area ratio of effective reflecting surface can be changed zone by zone or continuously to give a desired weight to the distribution of measuring sensitivity. In any case, the efficiency of light measuring increases by increasing the area ratio of effective reflecting surface and beam splitting efficiency is based on the angle of splitting of the beam and the intensity of the beam.

As shown in FIG. 18, pitch P is constant and therefore the angle of diffraction and the order N of diffracted light (N is an integer) hold the following relation:

$$2N p \sin\theta = N\lambda$$

wherein,
λ: wavelength of the incident light 240,
θ: angle of reflection of the split beam 245, and
n: refractive index of the optical transparent body 243.

From the above formula it is seen that the provision of a flat portion on the relief type diffraction lattice has no adverse effect and the direction of diffracted light remains unchanged.

FIG. 19 illustrates the stepwise change of the area ratio mentioned above.

Figure 19C:
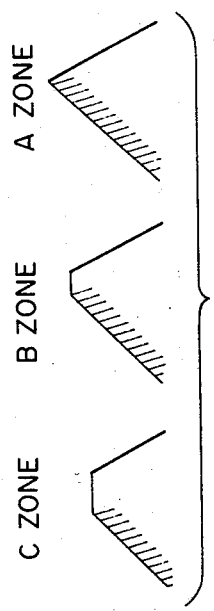
FIG. 19C shows, in sectional view, bits used for making the matrix for the grating or lattice.
Figure 19A:
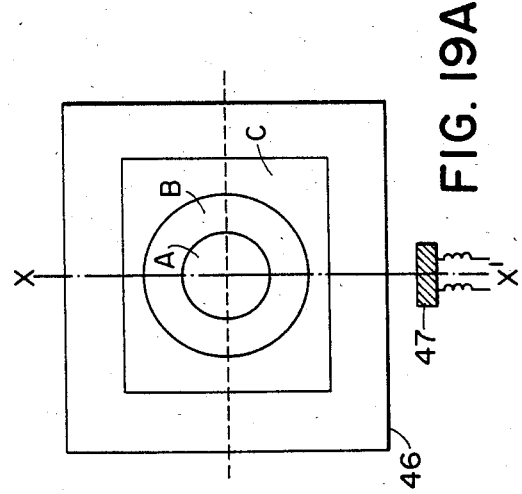
FIGS. 19A and 19B show, in plan and in section, respectively, a device in which the area ratio of effective reflecting surface is varied from one zone to another.

FIG. 19A is a plan view of a device in which the area ratio of effective reflecting surface is varied stepwise. For this end, the view field is divided into three zones A, B and C.

Figure 19B:
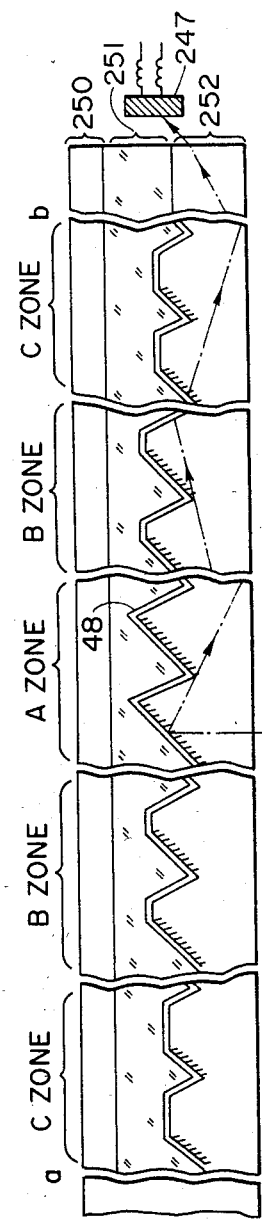

FIG. 19B is a sectional view of the lattice area taken along the line X—X' in FIG. 19A. As seen in FIG. 19B, three zones A, B and C have different area ratios with respect to each other. The area ratio of effective reflecting surface decreases stepwise from zone to zone in the order of A, B and C, that is, from the center zone to the outer zone.

In FIG. 19B, 250 and 252 are optical transparent bodies, 248 is a reflecting film, 247 is a photo detector and 249 is an incident light. The pitch of diffraction lattice is constant throughout all of the three zones.

Figure 20:
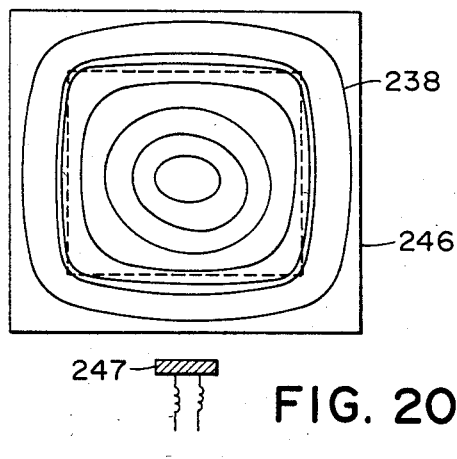
FIG. 20 shows the measurement distribution of the device.

By using the lattice structure shown in FIG. 19B there is obtained a distribution of measured light weighted at its central area as shown in FIG. 20. The distribution of light measuring sensitivity obtained by this embodiment contains no abrupt change in the vicinity of the boundary of the lattice and therefore it is very advantageous for measuring light.

The diffraction lattice structure shown and described above can be manufactured in mass production employing a suitable copy making technique such as compression from a master pattern. In mass production employing a master pattern, the manufacture of such diffraction lattice structure may be carried out in the following procedure:

(I) Three kinds of diamond bits as shown in FIG. 19C are prepared for making the master pattern.

(II) Lattices for the respective zones are engraved using the corresponding bits while selecting one diamond bit for one zone.

(III) As the bits have flat summits as shown in FIG. 19C, flat portions corresponding to the flat summits are provided at the bottom of every lattice on the master pattern.

(IV) Replicas are made from the prepared master pattern by compression. The replica has a flat portion at its crest. This replica corresponds to the optical transparent body 252 shown in FIG. 19B.

Figure 21:
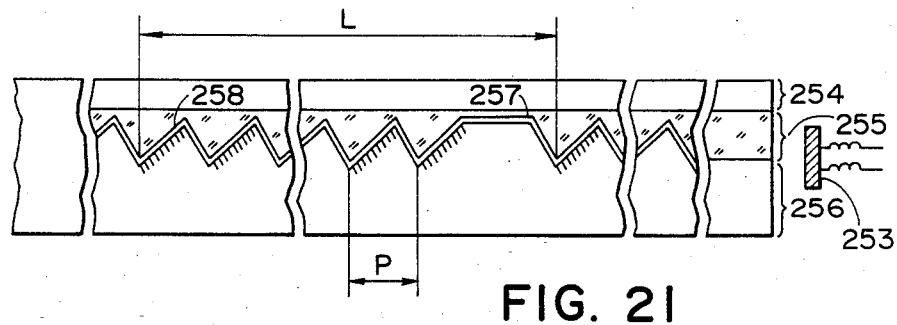
FIG. 21 shows a modification of the device having different area ratios of effective reflecting surface in different zones.

FIG. 21 shows a modification of the above embodiment. In the cross-section of a beam splitter shown in FIG. 21, the lattice has a constant height of relief. A flat portion 257 in an amount of one pitch is provided every N pitches. Generally speaking, when there is provided such flat portion in an amount of Ng pitch, the area ratio of effective reflecting surface obtained at that time is $(Ng-Ng')e/p \cdot Ng$. Therefore, the area ratio can be set to any desired value by suitably setting the length of such flat portion. In this case, the measuring visual field is divided into several zones as shown in FIG. 19A and the control of the length of such flat portion is conducted for every zone so as to give a desired weight to the distribution of measured light. In FIG. 21, reference numeral 258 designates a reflecting film, 254 and 256 are optical transparent bodies, 255 is a layer of bonding material and 253 is a photo detector.

Figure 22:
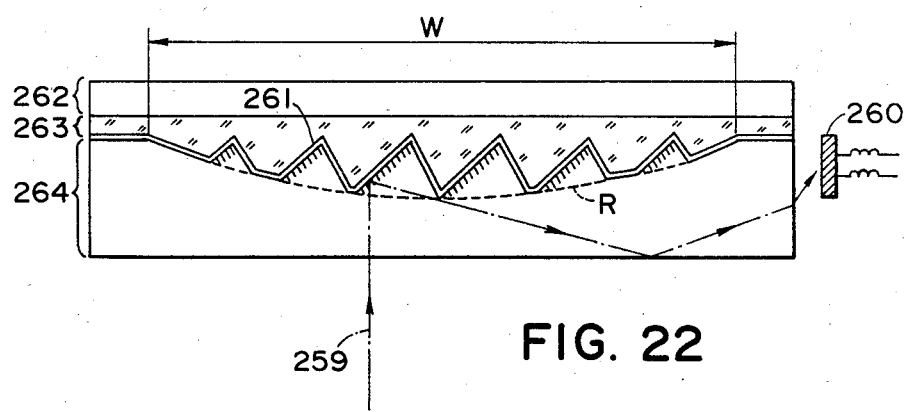
FIG. 22 shows a device in which the area ratio of effective reflecting surface is varied continuously.

FIG. 22 is a sectional view of a device in which the roots of the lattice arranged at equal pitch are flattened along a spherical surface. To make such a lattice, one polishes the surface of a blank into a spherical surface (diameter; R) before cutting the blank with a bit to prepare a master pattern for compression. After polishing, he carries out cutting on the spherical surface at equal pitch to form the desired pattern of lattice. At this time, the radius of curvature of the spherical surface, R is preferably determined by $R \simeq W^2/8 \times (\Delta h)$ wherein $\Delta h$ is the maximum difference in height between the crest and the bottom of the lattice and W is the size of area where the lattice is to be engraved.

In FIG. 22, reference numeral 261 designates a reflecting film, 262 and 264 are optical transparent bodies, 263 is a layer of adhesive, and 260 is a photo detector. The effective reflecting surface is indicated by hatching. It is readily seen that the area ratio of effective reflecting surface changes continuously. While the lattice has been shown to have the root portions along a spherical surface, it is also possible to make the crest portions along a spherical surface in the same manner. With such lattice structure, the same effect can be obtained.

Figure 23:
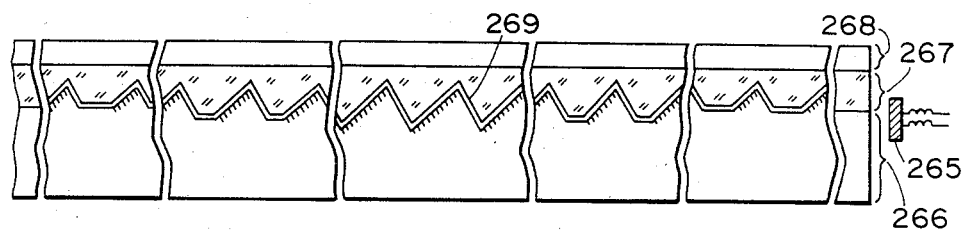
FIG. 23 shows another modification of the device having different area ratios of effective reflecting surface in different zones.

FIG. 23 is a sectional view of a device in which flat portions are provided at the root portions of the relief type diffraction lattice. In this device, the area ratio of the effective reflecting surface decreases gradually from the center of the measuring visual field toward the marginal thereof. In this figure 269 is a reflecting film, 266 and 268 are optical transparent bodies and 265 is a photo detector.

As will be understood from the foregoing, according to the above embodiment of the present invention, a desired weight can be given to the distribution of measured light by changing the shape of the relief diffraction lattice, in particular, by changing the area ratio of the effective reflecting surface in the lattice. In this case, as previously described, the area ratio of effective reflecting surface can be changed from zone to zone stepwise or continuously throughout the whole area of the measuring view field.

The following embodiment of the present invention is directed to a device in which the relief type diffraction lattice structure has a number of dot-like reflecting surfaces dispersed on the structure. Each dot-like reflecting surface is very small as compared with the size of the whole lattice. At least one of three factors, namely the shape, size and number of the dot-like reflecting surfaces is changed to vary the area ratio of reflecting film so that a desired weight can be given to the distribution of measuring sensitivity.

Figure 24:
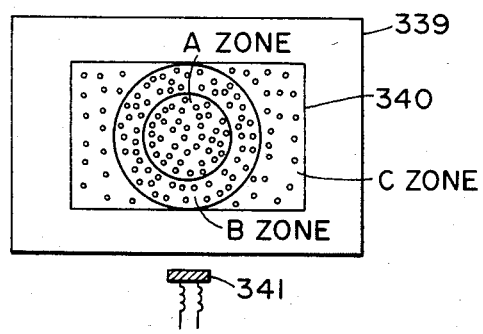
FIG. 24 shows a device in which the density of reflecting dots is varied from one zone to another.
Figure 25:
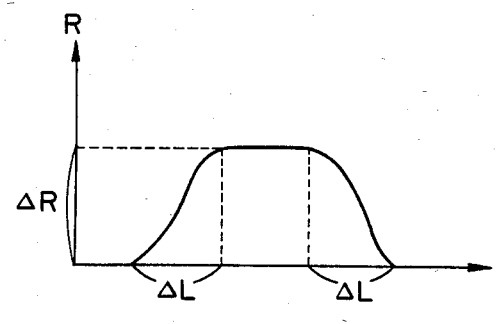
FIG. 25 is a curve for illustrating the condition necessary for making blurred the boundary between the portion having a reflecting film and the portion having no reflecting film.
Figure 26:
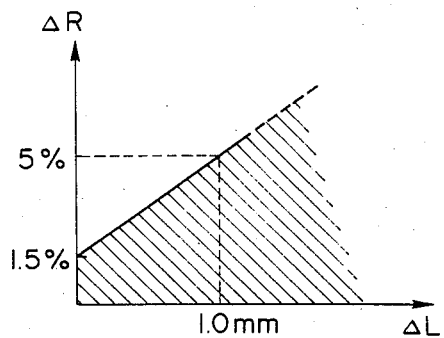
FIG. 26 illustrates the condition necessary for making invisible through the finder the shadow of a portion in which a reflecting film is present in a form of small dot pattern, when a beam splitter is located in a position 2 mm distant from the focal plane.
Figure 27:
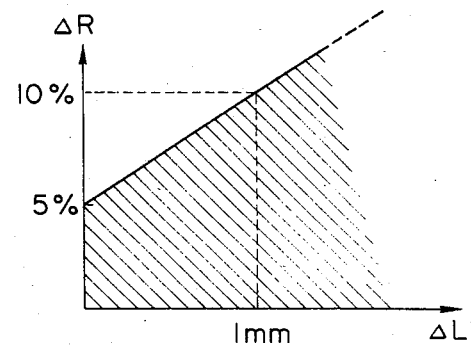
FIG. 27 is a view similar to FIG. 26 but for the case where the beam splitter is located 10 mm distant from the focal plane.

In FIG. 24, reference numeral 339 designates the whole measuring visual field and 340 is an area to which a reflectin film is applied in the form of fine patterns, and 341 is a photo detector. The area 340 is divided into three zones, A, B and C. The three zones each have a reflecting film composed of a number of small circular patterns. The diameter and density of the small circles are all the same in the same zone but different one zone from another. The reflection factor of the reflecting film is the same for all of zones A, B and C. For the purpose of explanation, the diameters of the small circles in the individual zones are denoted by $D_A$, $D_B$ and $D_C$, respectively. The number of the small circles per unit area (for example 1 mm$^2$), that is, the density of the small circles in zone A is denoted by $N_A$, that in zone B by $N_B$ and that in zone C by $N_C$.

The size of each small circle is so selected to be sufficiently small as compared with the size of the object on the light measuring plane and to cover the object by a great number of portions having reflecting film and portions having no reflecting film. Since different zones have different diameter and density of the small circles, the percentage of area such small circles with reflecting film have to the unit area varies from one zone to another. Namely, the area ratio of effective reflecting surface varies from one zone to another. This has an effect similar to that obtained by changing the reflection factor of the reflecting film. Thus, a desired weighting of the measured light can be attained.

The diameter of the small circle is, for this purpose, desired to be sufficiently small as compared with the measuring surface area. The diameter is preferably less than 2 mm. Let the reflection factor of the reflecting film be R(%) in every zone. Then, the reflection effect obtained thereby is $R \times N_A \times \pi (D_A/2)^2$ (%) for zone A, $R \times N_B \times \pi \times (D_B/2)^2$ (%) for zone B and $R \times N_C \times \pi \times (D_C/2)^2$ (%) for zone C. In this manner, by suitably selecting the size of such small circles and the density thereof, a desired weight can be given to the quantity of measured light on the measuring surface to realize a desired distribution of measuring sensitivity.

Such reflecting film in the form of a pattern composed of a number of small circles may be formed, for example, by employing the vacuum vapour deposition technique.

When the vacuum vapour deposition technique is used, a mask for vapour deposition must be prepared which has a number of fine openings as shown in FIG. 24. Such depositing mask may be prepared in the following procedure:

(1) Making a block copy having a desired pattern of a number of small circles;

(2) Reducing it into an original plate by a plate making camera;

(3) Making many plates by plate setting;

(4) Coating a substrate plate (for example, phosphor bronze plate, which later becomes a depositing mask) with a photosensitive material (such as photo resist) and carrying out an exposure on it with the original pattern being in close contact with the coated plate;

UNITED STATES PATENT AND TRADEMARK OFFICE
CERTIFICATE OF CORRECTION

PATENT NO. : 4,595,290
DATED : June 17, 1986
INVENTOR(S) : Noriyuki Nose et al.

It is certified that error appears in the above-identified patent and that said Letters Patent is hereby corrected as shown below:

Column 1, line 46, after "the" insert -- present --.

Column 1, line 47, delete "which is able" and change "measure" to -- measures --.

Column 1, line 56, change "DRAWING" to -- DRAWINGS --.

Column 5, lines 27-28, after "is" change "assigned to the assignee of this case U.S. Pat. No. 4,486,072" and insert -- U.S. Pat. No. 4,484,072 assigned to the assignee of this case --.

Column 6, line 24, change "d." to --$\underline{d}$:--.
Column 10, line 18, change "25%" to --2.5%--.
Column 13, line 44, change "maximium" to --maximum--.
Column 16, line 18, change "die for lattice" to --die for the lattice--.
Column 16, line 41, after "cutting" insert --.--.
Column 20, lines 15-16, change "but different one zone from another" to --but differ from one zone to another--.
Column 20, line 31, after "area" insert --of--.
Column 22, line 1, after "obtained" insert --in--.
Column 23, line 61, change "anc" to --and--.
Column 24, line 36, change "realizer" to --realizes--.
Column 25, line 43, change "one and same" to --one and the same--.
Column 25, line 43, change "compared" to --comparing--.
Column 26, line 18, change "mesuring" to --measuring--.
Column 26, line 23, change "tranparent" to --transparent--.

In the shown embodiment, the diameter of single fine dot pattern is 0.6 mm and the density of dot patterns is 2.25 dots/mm$^2$ for zone A and 1.3 dots/mm$^2$ for zone B. In this case, if there is applied uniformly 3% of the reflecting film for zones A and B, then the effect of reflection obtained thereby becomes 1.91% for zone A and 1.1% for zone B. In this manner, according to the embodiment, a desired weight can be given to the distribution of measuring sensitivity by changing the density of fine dot patterns only without any need of changing the size and form of the patterns.

Figure 28A:
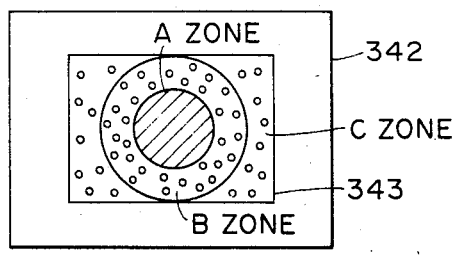
FIGS. 28A, 28B and 28C show, respectively, a device in which the diameter of dot is varied from one zone to another.
Figure 28B:
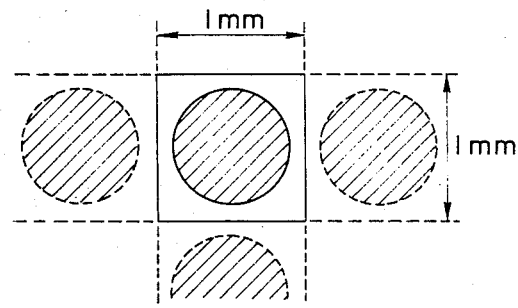
Figure 28C:
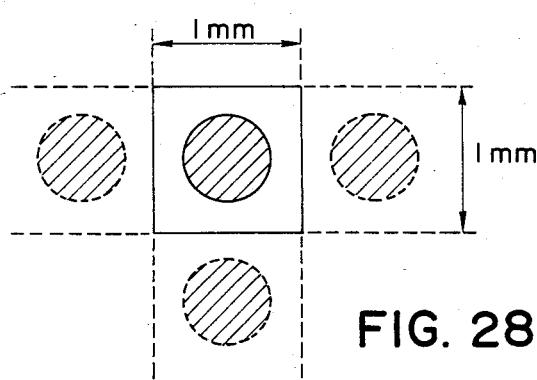
Figure 29:
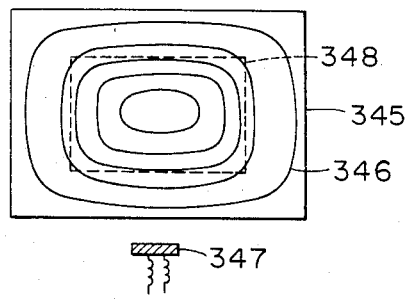
FIG. 29 shows the measurement distribution of the device.
Figure 30A:
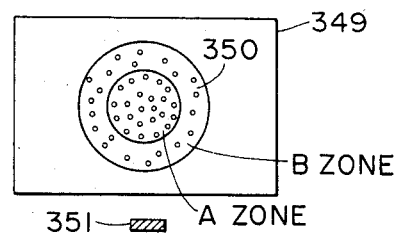
FIGS. 30A, 30B and 30C illustrate a device in which the density of dots is varied from one zone to another.
Figures 30B, 30C:
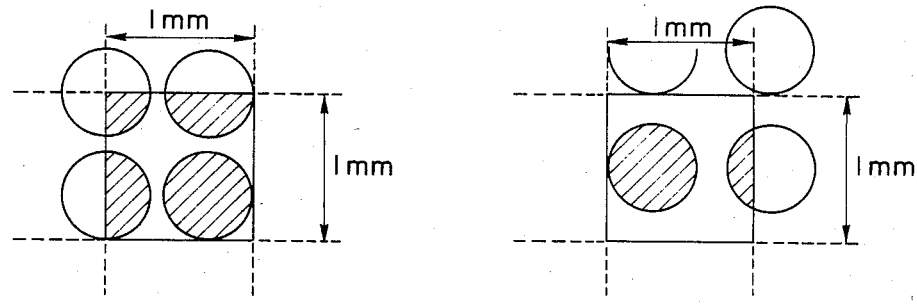
Figure 31:
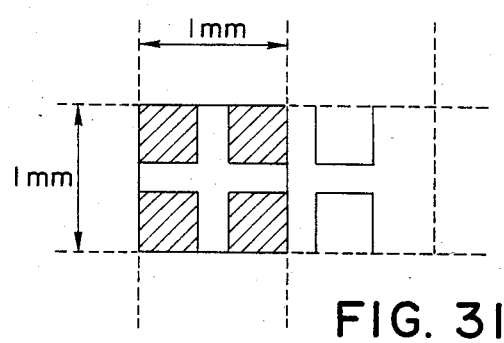
FIG. 31 illustrates a device having rectangular dot patterns.

FIG. 31 is a modification of the above embodiments shown in FIGS. 24, 28 and 30. In this modification, the shape of the respective fine patterns is not circular but square. In FIG. 31, the portions on which a reflecting film is to be applied are again indicated by hatching. In this modification also, the reflecting film can be formed employing the known vacuum vapour deposition technique. The depositing mask having a number of square bores necessary for carrying out the vapour deposition may be prepared, for example, by etching. Any desired weight can be given to the distribution of measuring sensitivity distribution by suitably selecting the size (area) of the square and the number of the square patterns per unit area, that is, the density of the square patterns. The form of the individual fine patterns is not limited to a square. It may be a rectangular form or polygonal form.

As readily understood from the foregoing, according to the above exbodiments there is obtained a beam splitter which provides a desired distribution of measured light without any adverse effect on the viewability of object through the finder and in which the measuring area in the view field is not perceivable to the eye when one observes the object through the finder. This is attained in a simple manner by varying the area ratio of effective reflecting surface when a reflecting film is applied onto the reflecting surface of a reflective type relief diffraction lattice. The reflecting surface is divided into zones. The reflecting film is applied to the divided zones in a form of many small patterns. The size, form and density of the fine patterns are all the same in one and same zone. However, compared one zone with another, the patterns are different from each other in at least one factor selected from the group consisting of size, form and density of patterns. In this manner, different zone are made to have different area ratios of effective reflecting surface when measured relative to a certain unit surface area.

While the above embodiments have been shown and described to have the beam splitting plane divided into a definite number of sectional areas to vary the area ratio of the effective reflecting surface stepwise. However, the same effect as described above may be attained by varying the area ratio continuously throughout the beam splitting plane.

Means for giving weights to the distribution of measuring sensitivity and concrete forms thereof as shown in the first, second, third and fourth embodiments may be used alone or in combination.

Also, it is to be understood that the above embodiments are never limited only to those for the center weighted average photo metering. They are also applicable to other types of photo metering system, such as a partial light measuring system, when light measuring is required without any loss of good viewability through the finder.

The beam splitter according to the present invention is adaptable with advantage to a light measuring device in a photographic camera. When the beam splitter is disposed in the optical path for the image forming beam within a camera, the beam splitter is able to split a portion of the incident light without the image forming beam being substantially affected by it. As to the location of the beam splitter in the optical path as well as the application forms thereof are described in detail in the previously referred to prior application, Japanese Patent Application laid open No. 42,042/1978.

While the beam splitter is particularly useful for the light measuring device of a photographic camera, it may be used in other optical apparatus for which it is required to split the incident light in such a manner as to produce a desired distribution of beam splitting rates.

What we claim is:

1. A device for mesuring light incident on an optical system, comprising:
    an optical system for defining an optical path;
    a beam splitter having a relief type diffraction lattice including a plurality of semi-reflecting oblique surfaces periodically arranged on a tranparent body, said diffraction lattice being disposed along the optical path to diffract a portion of the incident light and transmit another portion of the incident light, wherein the ratio of light diffraction to light transmission has a predetermined non-uniform distribution and changes continuously over the lattice area; and
    photo detector means for detecting the light diffracted from said diffraction lattice.

2. A device for measuring light incident on an optical system, comprising:
    an optical system for defining an optical path;
    a beam splitter including a plurality of semi-reflecting obliquie surfaces arranged on a transparent body and in said optical path, the reflectivity of said semi-reflecting oblique surfaces having a predetermined non-uniform distribution within the area in which said semi-reflecting surfaces are provided; wherein the reflectivity of said semi-reflecting surfaces changes stepwise at least over a part of the area in which said semi-reflecting surfaces are provided, and wherein the difference in reflectivity $\Delta R(\%)$ between the neighboring sub-areas having different reflectvities satisifies the following condition:

$$\Delta R \leq 3.1 \times \Delta L + 1.5$$

wherein, $\Delta L$(mm) is the distance between two points belonging to the respective sub-areas; and
    Photo detector means for receiving the light reflected from said beam splitter.

3. A device for measuring light incident on an optical system, comprising:
    an optical system defining an optical path;
    a beam splitter disposed to splita portion of the incident light and composed of a great number of reflecting dots dispersed on a plurality of oblique surfaces on a transparent body, wherein the size of the individual reflecting dots are extremely small as compared with the area of said beam splitter and the ratio of the area of said reflecting dots to a unit area changes over the area in which said reflecting dots are provided; and photo detector means to which the light split from said beam splitter is directed.

4. A light measuring device according to claim 3, wherein the size of the individual reflecting dots varies from one sub-area to another over the area in which said reflecting surfaces are provided.

5. A light measuring device according to claim 3, wherein the density of said reflecting dots varies from one sub-area to another over the area in which said reflecting surfaces are provided.

6. A light measuring device according to claim 3, wherein the difference in reflectivity between the reflecting dots and the obliquie surface other than said reflecting dots is less than 5%.

7. A light measuring device according to claim 2, 3, wherein said semi-reflecting surfaces are covered by a transparent body.

8. A light measuring device according to claim 1, 3, wherein said optical system is an image forming optical system and said beam splitter is disposed at or near the image plane of said optical system.

9. A device for measuring light incident on an optical system, comprising:

an optical system for defining an optical path;

a beam splitter incuding a plurality of semi-reflecting oblique surfaces arranged on a transparent body and in said optical path, the reflectivity of said semi-reflecting oblique surface having a predetermined non-uniform distribution within the area in which said semi-reflecting surfaces are provided, and wherein the reflectivity of said semi-reflecting surfaces changes continuously at least over a part of the area in which said semi-reflecting surfaces are provided, with the rate of change being less than 31.3% per mm; and photo detector means for receiving the light reflected from said beam splitter.

* * * * *

UNITED STATES PATENT AND TRADEMARK OFFICE
CERTIFICATE OF CORRECTION

PATENT NO. : 4,595,290
DATED : June 17, 1986
INVENTOR(S) : Noriyuki Nose et al.

It is certified that error appears in the above-identified patent and that said Letters Patent is hereby corrected as shown below:

Column 1, line 46, after "the" insert -- present --.

Column 1, line 47, delete "which is able" and change "measure" to -- measures --.

Column 1, line 56, change "DRAWING" to -- DRAWINGS --.

Column 5, lines 27-28, after "is" change "assigned to the assignee of this case U.S. Pat. No. 4,486,072" and insert -- U.S. Pat. No. 4,484,072 assigned to the assignee of this case --.

Column 6, line 24, change "d·" to --$\underline{d}$:--.
Column 10, line 18, change "25%" to --2.5%--.
Column 13, line 44, change "maximium" to --maximum--.
Column 16, line 18, change "die for lattice" to --die for the lattice--.
Column 16, line 41, after "cutting" insert --.--.
Column 20, lines 15-16, change "but different one zone from another" to --but differ from one zone to another--.
Column 20, line 31, after "area" insert --of--.
Column 22, line 1, after "obtained" insert --in--.
Column 23, line 61, change "anc" to --and--.
Column 24, line 36, change "realizer" to --realizes--.
Column 25, line 43, change "one and same" to --one and the same--.
Column 25, line 43, change "compared" to --comparing--.
Column 26, line 18, change "mesuring" to --measuring--.
Column 26, line 23, change "tranparent" to --transparent--.

UNITED STATES PATENT AND TRADEMARK OFFICE
CERTIFICATE OF CORRECTION

PATENT NO. : 4,595,290

DATED : June 17, 1986

INVENTOR(S) : Noriyuki Nose, et al.

It is certified that error appears in the above-identified patent and that said Letters Patent is hereby corrected as shown below:

```
Column 26, line 48, change "reflectvities" to --reflectivities--.
Column 26, line 55, change "Photo" to --photo--.
Column 26, line 60, change "splita" to --split a--.
Column 26, line 64, change "are" to --is--.
Column 27, line 13, change "obliquie" to --oblique--.
Column 27, line 15, delete "2,".
Column 27, line 18, delete "1,".
```

Signed and Sealed this

Seventeenth Day of February, 1987

Attest:

DONALD J. QUIGG

Attesting Officer     Commissioner of Patents and Trademarks